United States Patent
Takahashi et al.

(10) Patent No.: US 12,432,740 B2
(45) Date of Patent: Sep. 30, 2025

(54) TERMINAL AND RADIO COMMUNICATION METHOD

(71) Applicant: NTT DOCOMO, INC., Tokyo (JP)

(72) Inventors: Yuki Takahashi, Tokyo (JP); Satoshi Nagata, Tokyo (JP); Lihui Wang, Beijing (CN); Xiaohong Zhang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 349 days.

(21) Appl. No.: 17/774,675

(22) PCT Filed: Nov. 6, 2019

(86) PCT No.: PCT/JP2019/043520
§ 371 (c)(1),
(2) Date: May 5, 2022

(87) PCT Pub. No.: WO2021/090409
PCT Pub. Date: May 14, 2021

(65) Prior Publication Data
US 2022/0408476 A1    Dec. 22, 2022

(51) Int. Cl.
*H04W 72/00*    (2023.01)
*H04L 1/08*    (2006.01)
*H04W 72/23*    (2023.01)

(52) U.S. Cl.
CPC ............... *H04W 72/23* (2023.01); *H04L 1/08* (2013.01)

(58) Field of Classification Search
None
See application file for complete search history.

(56) References Cited

U.S. PATENT DOCUMENTS

| | | | |
|---|---|---|---|
| 12,184,580 B2* | 12/2024 | Takeda | H04L 5/0053 |
| 2012/0170524 A1* | 7/2012 | Ren | H04W 72/04 370/329 |
| 2017/0013565 A1* | 1/2017 | Pelletier | H04W 52/365 |
| 2019/0215862 A1* | 7/2019 | Kim | H04W 72/23 |
| 2019/0335488 A1 | 10/2019 | Xiong et al. | |
| 2019/0363843 A1* | 11/2019 | Gordaychik | H04W 72/044 |
| 2020/0068599 A1* | 2/2020 | Yang | H04L 5/0055 |
| 2020/0146045 A1* | 5/2020 | Loehr | H04L 1/1812 |

(Continued)

FOREIGN PATENT DOCUMENTS

CN    112135356 A  * 12/2020    .......... H04W 72/569

OTHER PUBLICATIONS

International Search Report issued in PCT/JP2019/043520 on Jul. 21, 2020 (2 pages).

(Continued)

*Primary Examiner* — Brandon M Renner
(74) *Attorney, Agent, or Firm* — Osha Bergman Watanabe & Burton LLP

(57) ABSTRACT

A terminal according to an aspect of the present disclosure includes a transmitting section that transmits a configured grant-based uplink shared channel, a receiving section that receives downlink control information which indicates retransmission of the uplink shared channel, and a control section that controls the retransmission based on a priority configured for the retransmission of the uplink shared channel.

4 Claims, 7 Drawing Sheets

(56) References Cited

U.S. PATENT DOCUMENTS

2021/0385809 A1* 12/2021 Kang ................ H04W 72/0453
2022/0078813 A1* 3/2022 Miao ................ H04W 36/0088

OTHER PUBLICATIONS

Written Opinion of the International Searching Authority issued in PCT/JP2019/043520 on Jul. 21, 2020 (3 pages).
InterDigital Inc.; "UCI Enhancements for eURLLC"; 3GPP TSG RAN WG1 #98bis, R1-1911296; Chongqing, China; Oct. 14-20, 2019 (9 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

* cited by examiner

TERMINAL AND RADIO COMMUNICATION METHOD

TECHNICAL FIELD

The present disclosure relates to a terminal and a radio communication method in next-generation mobile communication systems.

BACKGROUND ART

In the universal mobile telecommunications system (UMTS) network, the specifications of long term evolution (LTE) have been drafted for the purpose of further increasing data rates, providing low delays, and so on (see Non Patent Literature 1). In addition, the specifications of LTE-Advanced (3rd generation partnership project (3GPP) Release (Rel.) 10 to 14) have been drafted for the purpose of further increasing capacity and advancement of LTE (3GPP Rel. 8 and 9).

Successor systems to LTE (for example, also referred to as 5th generation mobile communication system (5G), 5G+ (plus), New Radio (NR), or 3GPP Rel. 15 or later) are also being studied.

In existing LTE systems (for example, LTE Rel. 8 to 15), a user terminal (User Equipment (UE)) transmits uplink control information (UCI) by using at least one of a UL data channel (for example, Physical Uplink Shared Channel (PUSCH)) and a UL control channel (for example, Physical Uplink Control Channel (PUCCH)).

For example, the UCI may include retransmission control information (also referred to as Hybrid Automatic Repeat reQuest Acknowledgement (HARQ-ACK), ACK/NACK, A/N, etc.) for downlink shared channel (Physical Downlink Shared Channel (PDSCH), scheduling request (SR), channel state information (CSI), and the like.

CITATION LIST

Non Patent Literature

Non Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April, 2010

SUMMARY OF INVENTION

Technical Problem

Future radio communication systems (e.g., 5G or NR) are expected to involve a plurality of types of communication (also referred to as traffic types, use cases, services, communication types, and the like) under different required conditions (requirements, communication requirements) examples of which include: higher speed and larger capacity (eMBB: enhanced Mobile Broad Band, for example), a massive amount of terminals (mMTC: massive Machine Type Communication, for example), and ultrahigh reliability and low latency (URLLC: Ultra Reliable and Low Latency Communications, for example). The requirement may be any requirement related to at least one of latency, reliability, capacity, speed, and performance, for example.

In the NR after Rel-16, it is considered that priority is set to at least one of a given UL signal and UL channel (hereinafter, also referred to as an UL signal/UL channel) based on a requirement or the like. However, how to set the priority for each UL signal/UL channel has not been sufficiently studied.

Therefore, an object of the present disclosure is to provide a terminal and a radio communication method capable of appropriately controlling UL transmission even in a case where priority is configured to at least one of an UL signal and UL channel.

Solution to Problem

A terminal according to an aspect of the present disclosure includes a transmitting section that transmits a configured grant-based uplink shared channel, a receiving section that receives downlink control information which indicates retransmission of the uplink shared channel, and a control section that controls the retransmission based on a priority configured for the retransmission of the uplink shared channel.

Advantageous Effects of Invention

According to one aspect of the present disclosure, even when a priority is configured to at least one of the UL signal and the UL channel, the UL transmission can be appropriately controlled.

DESCRIPTION OF EMBODIMENTS

<Traffic Type>

Figure 1:
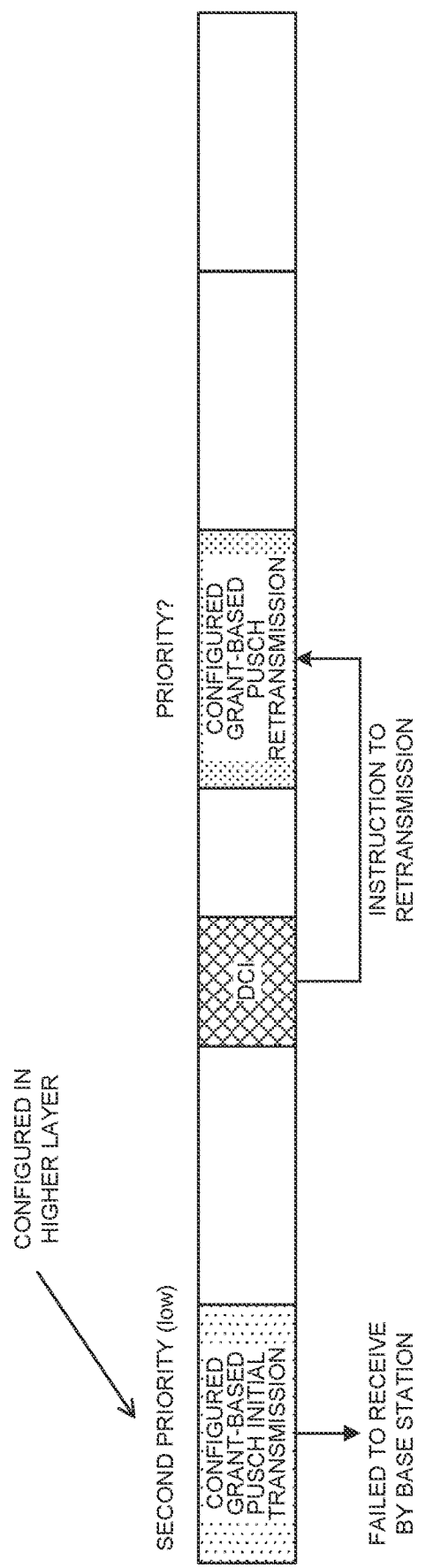
FIG. 1 is a diagram for explaining retransmission and priority of a configured grant-based PUSCH.

Future radio communication systems (for example, NR) are expected to involve traffic types (also referred to as services, service types, communication types, use cases, or the like) such as an enhanced mobile broadband (eMBB), machine type communications that embody multiple simultaneous connection (for example, massive machine type communications (mMTC), and Internet of Things (IoT)), and ultra-reliable and low-latency communications (URLLC). For example, it is required that the URLLC have smaller latency and higher reliability than the eMBB.

The traffic type may be identified in a physical layer based on at least one of the following.

Logical channels with different priorities

Modulation and coding scheme (MCS) table (MCS index table)

Channel quality indication (CQI) table

DCI format
System information-radio network temporary identifier (RNTI) used for scrambling (masking) of cyclic redundancy check (CRC) bit included in (added to) the DCI (DCI format)
Radio resource control (RRC) parameter
Specific RNTI (for example, RNTI for URLLC, MCS-C-RNTI, or the like)
Search Space
Given field in DCI (for example, newly added field or reuse of existing field)

Specifically, a traffic type of the HARQ-ACK for a PDSCH may be determined based on at least one of the following.

MCS index table used to determine at least one of the modulation order, target code rate, and transport block size (TBS) of the PDSCH (for example, whether to use MCS index table 3)

RNTI used for CRC scrambling of DCI used for scheduling the PDSCH (for example, whether CRC scrambled with C-RNTI or MCS-C-RNTI)

A traffic type of the SR may be determined based on a higher layer parameter used as an SR identifier (SR-ID). The higher layer parameter may indicate whether the traffic type of the SR is eMBB or URLLC.

A traffic type of the CSI may be determined based on configuration information related to CSI report (CSI report setting), a DCI type used for triggering, a DCI transmission parameter, or the like. The configuration information, the DCI type, or the like may indicate whether the traffic type of the CSI is eMBB or URLLC. The configuration information may be a higher layer parameter.

A traffic type of a physical uplink shared channel (PUSCH) may be determined based on at least one of the following.

MCS index table used to determine at least one of modulation order, target coding rate, and transport block size (TBS) of PUSCH (for example, whether or not to use MCS index table 3).

RNTI used for CRC scrambling of DCI used for scheduling of PUSCH (for example, whether CRC scrambling is performed using C-RNTI or using MCS-C-RNTI)

The traffic type may be associated with communication requirements (requirements such as latency and error rate), a data type (voice, data, or the like), or the like.

URLLC requirements and eMBB requirements may be different in that the URLLC is lower in latency than the eMBB or the URLLC requirements include a reliability requirement.

For example, eMBB user (U)-plane latency requirements may include that downlink U-plane latency is 4 ms and that uplink U-plane latency is 4 ms. On the other hand, URLLC U-plane latency requirements may include that downlink U-plane latency is 0.5 ms and that uplink U-plane latency is 0.5 ms. Furthermore, the URLLC reliability requirements may include that a 32-byte error rate is $10^{-5}$ for a U-plane latency of 1 ms.

In contrast, enhancement of the reliability of traffic for unicast data is mainly studied as enhanced ultra reliable and low latency communications (eURLLC). Hereinafter, in a case where URLLC and eURLLC are not distinguished, they are simply referred to as URLLC.

<Dynamic Grant-Based Transmission and Configured Grant-Based Transmission (Type 1, Type 2)>

Dynamic grant-based transmission and configured grant-based transmission have been studied for UL transmission of NR.

Dynamic grant-based transmission is a method for performing UL transmission by using a Physical Uplink Shared Channel (PUSCH) based on a dynamic UL grant (dynamic grant).

The configured grant-based transmission is a method of performing UL transmission using an uplink shared channel (for example, PUSCH) based on the UL grant configured by the higher layer (for example, configured grant, may be referred to as configured UL grant or the like). In the configured grant-based transmission, a UL resource is already allocated to the UE, and the UE can voluntarily perform UL transmission by using a configured resource, and therefore, implementation of low latency communication can be expected.

The dynamic grant-based transmission may be referred to as a dynamic grant-based PUSCH, UL transmission with dynamic grant, PUSCH with dynamic grant, UL transmission with UL grant, UL grant-based transmission, UL transmission scheduled (for which a transmission resource is configured) by dynamic grant, and the like.

The configured grant-based transmission may be referred to as a configured grant-based PUSCH, UL transmission with configured grant, PUSCH with configured grant, UL transmission without UL grant, UL grant-free transmission, UL transmission scheduled (for which transmission resource is configured) by configured grant, and the like.

Furthermore, the configured grant-based transmission may be defined as one type of UL semi-persistent scheduling (SPS). In the present disclosure, "configured grant" may mutually be replaced with "SPS", "SPS/configured grant", and the like.

Several types (type 1, type 2, or the like) are being studied for configured grant-based transmission.

In configured grant type 1 transmission, the parameters used for configured grant-based transmission (which may also be referred to as configured grant-based transmission parameters, configured grant parameters, or the like) are configured in the UE using only higher layer signaling.

In configured grant type 2 transmission, a configured grant parameter is configured to the UE by higher layer signaling. In the configured grant type 2 transmission, notification of at least a part of the configured grant parameters may be provided to the UE by physical layer signaling (for example, activation downlink control information (DCI) described later).

Here, the higher layer signaling may be, for example, any of radio resource control (RRC) signaling, medium access control (MAC) signaling, broadcast information, and so on, or a combination thereof.

For example, a MAC control element (MAC CE), a MAC protocol data unit (PDU), or the like may be used for the MAC signaling. The broadcast information may be, for example, a Master Information Block (MIB), a System Information Block (SIB), Remaining Minimum System Information (RMSI), Other System Information (OSI), or the like.

The configured grant parameter may be configured in the UE using a ConfiguredGrantConfig information element of RRC. The configured grant parameters may include information specifying a configured grant resource, for example. The configured grant parameters may include information regarding, for example, an index of the configured grant, a time offset, periodicity, the number of repeated transmissions of a transport block (TB) (the number of repeated transmissions may be expressed as K), a Redundancy Version (RV) sequence used in the repeated transmissions, the above-described timer, and the like.

Here, the periodicity and the time offset each may be represented in units of symbols, slots, subframes, frames, or the like. The periodicity may be indicated by, for example, a given number of symbols. The time offset may be indicated by an offset with respect to a timing of a given index (such as slot number=0 and/or system frame number=0), for example. The number of repeated transmissions may be an arbitrary integer, for example, 1, 2, 4, 8, or the like. In a case where the number of repeated transmissions is n (>0), the UE may perform configured grant-based PUSCH transmission of a given TB by using n times of transmission occasions.

The UE may determine that one or more configured grants have been triggered if the configured grant type 1 transmission is set. The UE may perform PUSCH transmission by using configured resource for configured grant-based transmission (which may also be referred to as a configured grant resource, a transmission occasion, or the like). Note that, even when the configured grant-based transmission is configured, the UE may skip the configured grant-based transmission when there is no data in the transmission buffer.

When the configured grant type 2 transmission is configured and notification of a given activation signal is provided, the UE may determine that one or more configured grants have been triggered (or activated). The given activation signal (DCI for activation) may be DCI (PDCCH) scrambled by a Cyclic Redundancy Check (CRC) with a given identifier (for example, Configured Scheduling RNTI (CS-RNTI)). Note that the DCI may be used for control such as deactivation and retransmission of the configured grant.

The UE may determine whether or not to perform PUSCH transmission by using the configured grant resource configured in the higher layer based on the given activation signal described above. Based on the DCI for deactivating a configured grant or on the expiration (elapse of a given time) of a given timer, the UE may release (which may also be referred to as deactivate, or the like) a resource (PUSCH) corresponding to the configured grant.

Note that, even when the configured grant-based transmission is activated (in an active state), the UE may skip the configured grant-based transmission when there is no data in the transmission buffer.

Note that, each of the dynamic grant and the configured grant may be referred to as an actual UL grant. That is, the actual UL grant may be higher layer signaling (for example, ConfiguredGrantConfig information element of RRC), physical layer signaling (for example, the above-described given activation signal), or a combination thereof.

By the way, a multi configured grant may be set in one cell in the UE, and the UE may be in a state where the multi configured grant is triggered (or activated) in a given period.

However, when a multi configured grant is set, triggered, or activated, which configured grant the UE uses for UL transmission has not been studied yet. There is a problem that, if it is not specified that the configured grant-based transmission is performed at an appropriate transmission occasion, the communication throughput decreases.

Therefore, the inventors of the present invention have conceived of a method of performing configured grant-based transmission at an appropriate transmission occasion even when a multi configured grant is configured.

Hereinafter, embodiments according to the present disclosure will be described in detail with reference to the drawings. Radio communication methods according to the respective embodiments may be applied independently, or may be applied in combination.

Hereinafter, "configured grant" may be read as "configuration of configured grants". "Determining a configured grant for performing configured grant-based transmission" may be simply referred to as "selecting a configured grant". Furthermore, "traffic", "data", "UL data", "PUSCH", and "transport block" may be replaced with each other.

<Priority Setting>

Further, in the NR after Rel. 16, setting priorities at a plurality of levels (for example, two levels) for a given signal is being studied. For example, it is assumed that communication is controlled (for example, transmission control at the time of collision, and the like) by setting different priorities for every signal or channel each corresponding to different traffic types (also referred to as services, service types, communication types, use cases, and the like). This makes it possible to set different priorities for the same signal or channel (for example, different priorities depending on a service type).

The priority may be set for a signal (for example, UCI, a reference signal, or the like), a channel, a HARQ-ACK codebook, or the like. The priority may be defined by a first priority (for example, High) and a second priority (for example, Low) that is lower than the first priority. Alternatively, three or more types of priorities may be set. Notification of the information regarding the priority may be provided from a base station to the UE by using at least one of higher layer signaling and DCI.

For example, priorities may be set for HARQ-ACK for PDSCH that is dynamically scheduled, HARQ-ACK for semi-persistent PDSCH (SPS PDSCH), and HARQ-ACK for SPS PDSCH release. Alternatively, priorities may be set for HARQ-ACK codebooks corresponding to these HARQ-ACKs.

In addition, priorities may be set to a dynamic grant-based PUSCH, a configured grant-based PUSCH, or the like.

A UE may control UL transmission based on the priorities in a case where different UL signals or UL channels conflict. For example, control may be performed so that UL transmission with high priority is performed and that UL transmission with low priority is not performed (for example, to drop). Alternatively, transmission timing of UL transmission with low priority may be changed (for example, to defer or to shift).

The collision between different UL signals/UL channels may be a case where time resources (or time resources and frequency resources) of the different UL signals or UL channels overlap with each other or a case where transmission timing of the different UL signals or UL channels overlap with each other.

The priority may be set by explicit notification such as higher layer signaling from a network (for example, a base station). For example, the priority may be set or mapped to at least one of the HARQ-ACK for SPS PDSCH and the ACK for SPS PDSCH release by using higher layer signaling for providing notification of each SPS configuration (SPS PDSCH configuration).

Alternatively, the priority may be set or mapped to the configured grant-based PUSCH by using higher layer signaling or a higher layer parameter providing notification of the configuration of the configuration grant (for example, ConfiguredGrantConfig).

On the other hand, when the network (for example, a base station) fails (or is not successful) in receiving the configured grant-based PUSCH transmitted from the UE, it is also assumed that retransmission of the configured grant-based PUSCH is to be given in instruction or scheduled. For example, it is conceivable that the base station indicates the UE to retransmit the configured grant-based PUSCH transmission in downlink control information (for example, UL grant) (see FIG. 1).

In such a case, how to set the priority of retransmission of the configured grant-based PUSCH becomes an issue. If the priority is not appropriately set, retransmission of the configured grant-based PUSCH cannot be appropriately transmitted, and the communication throughput may be deteriorated.

Therefore, the present inventors have conceived a method of appropriately determining a priority and controlling retransmission even in a case of performing the configured grant-based retransmission. According to an aspect of the present invention, the priority can be appropriately set even in a case of performing the configured grant-based retransmission.

Hereinafter, embodiments according to the present disclosure will be described in detail with reference to the drawings. Radio communication methods according to the respective embodiments may be applied independently, or may be applied in combination.

In addition, in the following description, a first priority (High) and a second priority (Low) will be described as examples of priorities, however, the number and type of the priorities are not limited thereto. Three or more types (or three or more levels) of priorities may be applied. Furthermore, a priority set to each signal/channel may be set in the UE by at least one of higher layer signaling and downlink control information.

In addition, in the following description, the configured grant-based retransmission will be described as an example, but the UL signal/UL channel to which the present embodiment can be applied is not limited thereto. The present invention may be applied to retransmission of other UL signals/UL channels (for example, retransmission of dynamic grant-based PUSCH, retransmission of PRACH, and the like).

(First Aspect)

In the first aspect, a case where priority at the time of retransmission is determined based on a preset priority (for example, priority level) will be described.

When an instruction of the retransmission of the configured grant-based PUSCH is given by the downlink control information (for example, UL grant), the UE controls the retransmission of the PUSCH based on the priority provided in notification or configured by the higher layer signaling. That is, the UE uses the priority provided in notification in the higher layer signaling regardless of the downlink control information (or DCI format).

The higher layer signaling that provides notification of the priority may be higher layer signaling (for example, ConfiguredGrantConfig) that configures a transmission parameter of a configured grant-based PUSCH (for example, a configured grant-based PUSCH for initial transmission). Alternatively, the notification of the priority may be provided to the UE by using higher layer signaling different from the higher layer signaling for configuring the transmission parameter of the configured grant-based PUSCH.

In addition, the priority may be configured in common to the type 1 configured grant-based PUSCH and the type 2 configured grant-based PUSCH. Alternatively, priorities may be separately configured to the type 1 configured grant-based PUSCH and the type 2 configured grant-based PUSCH. If the priorities are separately configured, the priority may be configured in higher layer signaling for the type 1 configured grant PUSCH, and the priority may be configured in DCI giving an instruction of activation for the type 2 configured grant PUSCH.

The initial transmission (CG initial Tx) of the configured grant-based PUSCH may be a PUSCH scheduled with a PDCCH (or DCI) that is CRC-scrambled with a given RNTI (for example, CS-RNTI) and has a new data indicator (NDI) of 0. The retransmission (CG Re-tx) of the configured grant-based PUSCH may be a PUSCH scheduled with a PDCCH (or DCI) that is CRC-scrambled with a given RNTI (for example, CS-RNTI) and has a new data indicator (NDI) of 1.

Figure 2:
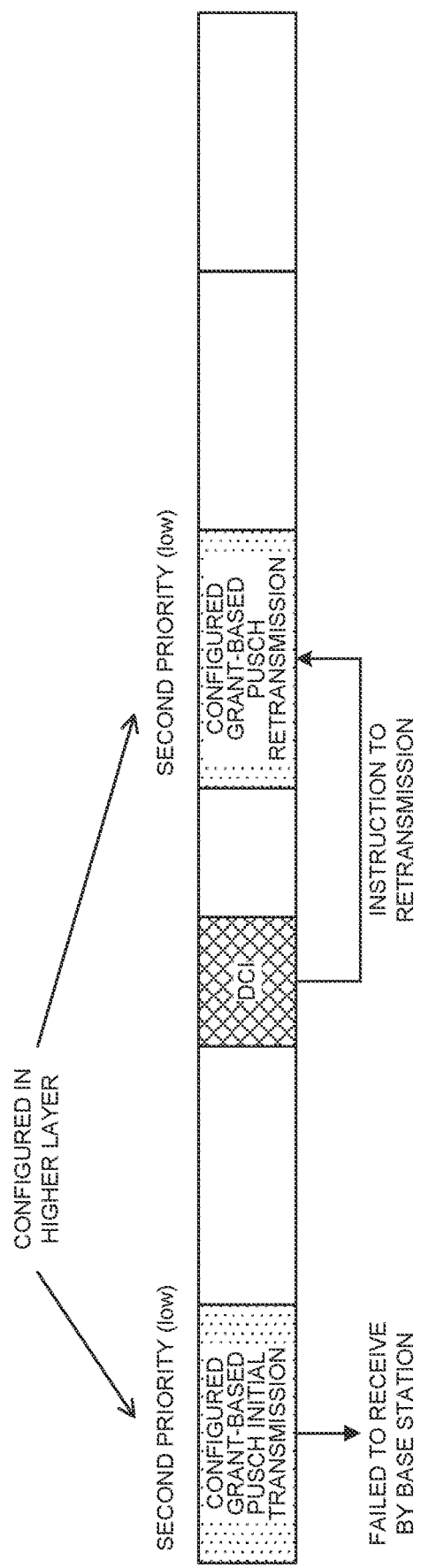
FIG. 2 is a diagram illustrating an example of priority to be configured for retransmission of a configured grant-based PUSCH.

FIG. 2 is a diagram illustrating an example of priority to be applied to retransmission of the configured grant-based PUSCH. Here, a case where the second priority (for example, Low) is configured for the configured grant-based PUSCH transmission (for example, initial configured grant-based PUSCH transmission) is illustrated.

When failing to receive the configured grant-based PUSCH transmission transmitted from the UE, the base station instructs the UE to retransmit the PUSCH using downlink control information (for example, UL grant). For example, the base station may give an instruction of retransmission by using DCI that is CRC-scrambled with a given RNTI (for example, CS-RNTI).

When receiving the DCI giving the instruction of retransmission of the configured grant-based PUSCH, the UE configures the priority preset in the higher layer signaling to the PUSCH of retransmission and controls the retransmission. Here, the second priority (Low) is configured to the configured grant-based PUSCH to be retransmitted.

In a case where retransmission of the configured grant-based PUSCH collides with another UL transmission for which the first priority (for example, High) is configured, the UE performs control to prioritize the another UL transmission. For example, the UE may perform control not to perform (or to drop) retransmission of the configured grant-based PUSCH.

On the other hand, when the first priority (for example, High) is configured for the configured grant-based PUSCH transmission (for example, initial configured grant-based PUSCH transmission), the UE may configure the first priority (High) for the configured grant-based PUSCH to be retransmitted.

When the DCI (for example, UL grant) indicating or scheduling the retransmission of the configured grant-based PUSCH includes the information indicating the priority, the UE may ignore the priority indicated by the DCI. Alternatively, the UE may assume that the priority indicated in the DCI indicating or scheduling the retransmission of the configured grant-based PUSCH and the priority configured in the higher layer signaling are the same (or, they are not assumed to be different).

In this manner, the priority configured by the higher layer signaling for the configured grant-based PUSCH is also applied to the PUSCH for retransmission, whereby the priority at the time of retransmission can be appropriately determined. In addition, since it is not necessary to include the information regarding the priority in the DCI (for example, UL grant) indicating retransmission, an increase in the overhead of the DCI can be suppressed.

Note that, in the above description, the case where the priority at the time of retransmission is determined using the higher layer signaling or another higher layer signaling used for the configuration of the configured grant-based PUSCH has been described, but the present aspect is not limited thereto. For example, in the type 2 configured grant-based PUSCH transmission, the priority at the time of retransmission may be set using DCI giving an instruction of activation of the PUSCH transmission.

(Second Aspect)

In a second aspect, a case where priority at the time of retransmission is determined based on downlink control information indicating retransmission will be described.

When an instruction of the retransmission of the configured grant-based PUSCH is given by the downlink control information (for example, UL grant), the UE controls the retransmission of the PUSCH based on the priority obtained from the downlink control information (or obtained from information related to the downlink control information). The downlink control information providing notification of the priority may be in a given DCI format. The DCI format may be at least one of a DCI format 0_0, 0_1 and a DCI format 0_2.

The notification of the priority may be explicitly provided to the UE in the DCI. For example, the UE may determine the priority at the time of retransmission based on bit information included in the DCI.

Alternatively, the priority may be associated with a transmission condition or a transmission parameter applied to the DCI.

For example, the UE may determine the priority at the time of retransmission based on RNTI type applied to the DCI. Alternatively, the UE may determine the priority at the time of retransmission based on at least one of the format and the size of the DCI. Alternatively, the UE may determine the priority at the time of retransmission based on at least one of a search space where the DCI is transmitted and a control resource set (CORESET).

Alternatively, the priority may be associated with a transmission condition or a transmission parameter of the PUSCH to be retransmitted. For example, the UE may determine the priority at the time of retransmission based on the number of repeated transmissions (or a repetition factor) of the PUSCH to be retransmitted.

Figure 3:
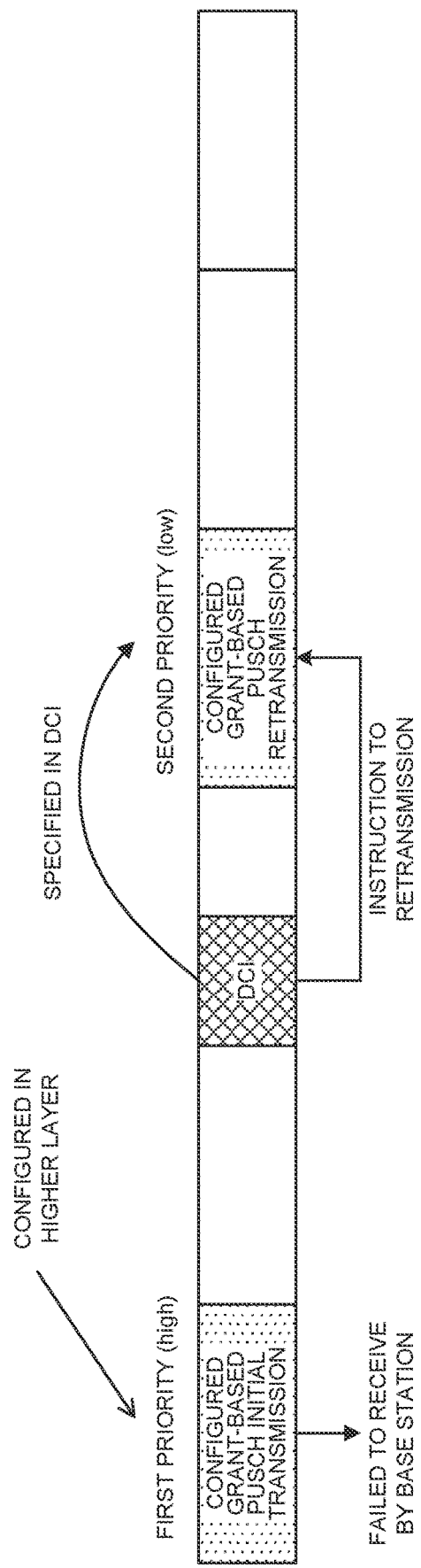
FIG. 3 is a diagram illustrating another example of priority to be configured for retransmission of a configured grant-based PUSCH.

FIG. 3 is a diagram illustrating an example of priority to be applied to retransmission of the configured grant-based PUSCH. Here, a case where the first priority (for example, High) is configured for the configured grant-based PUSCH transmission (for example, initial configured grant-based PUSCH transmission) is illustrated.

When failing to receive the configured grant-based PUSCH transmission transmitted from the UE, the base station instructs the UE to retransmit the PUSCH using downlink control information (for example, UL grant). For example, the base station may notify the UE of information regarding the priority of retransmission of the configured grant-based PUSCH using the downlink control information.

For retransmission of the configured grant-based PUSCH, the UE controls the retransmission according to the priority obtained based on the downlink control information giving the instruction of the retransmission. Here, a case where the second priority (for example, Low) is configured to the configured grant-based PUSCH to be retransmitted based on the downlink control information is illustrated.

The notification of the priority may be explicitly provided in the DCI. Alternatively, the priority may be associated with an RNTI type that is addressed to the DCI (for example, that is used for CRC scrambling of the DCI). For example, the DCI instructing or scheduling retransmission may correspond to the first priority when being CRC-scrambled with the first RNTI type, and correspond to the second priority when being CRC-scrambled with the second RNTI type.

Alternatively, the priority may be associated with the format of the DCI. For example, the DCI giving the instruction of or scheduling retransmission may correspond to the first priority when transmitted in the first DCI format, and correspond to the second priority when transmitted in the second DCI format.

Alternatively, the priority may be associated with the size of the DCI. For example, when the size of the DCI giving the instruction of or scheduling retransmission is transmitted with a first size larger than a given value, the DCI may correspond to the first priority, and when the DCI is transmitted with a second size equal to or smaller than the given value, the DCI may correspond to the second priority. Alternatively, when the size of the DCI is transmitted with the second size equal to or smaller than the given value, the DCI may correspond to the first priority, and when the size of the DCI is transmitted with the first size greater than the given value, the DCI may correspond to the second priority.

Alternatively, the priority may be associated with the search space type where the DCI is transmitted. For example, the DCI giving the instruction of or scheduling retransmission may correspond to the first priority when transmitted in common search space (for example, the common search space), and correspond to the second priority when transmitted in UE specific search space. Alternatively, when the DCI is transmitted in the UE specific search space, the DCI may correspond to the first priority, and when the DCI is transmitted in the common search space, the DCI may correspond to the second priority.

In this manner, by determining the priority at the time of retransmission based on the signal (for example, DCI) giving the instruction of retransmission of the configured grant-based PUSCH, the priority at the time of retransmission can be flexibly controlled.

(Variations)

The UE may control a priority determination method at the time of retransmission according to the DCI format for giving the instruction of or scheduling retransmission of the configured grant-based PUSCH.

<DCI Format 0_0>

Fallback DCI (for example, DCI format 0_0) may be configured not to be used for notification of the priority of the PUSCH. When the instruction of the retransmission of the configured grant-based PUSCH is given by the DCI format 0_0, the UE may determine the priority of the PUSCH at the time of the retransmission based on at least one of the following options 1-1 to 1-4.

[Option 1-1]

The priority notification of which is provided by the higher layer signaling for configuring the configured grant-based PUSCH (for example, a configured grant-based PUSCH for initial transmission) may be applied to the PUSCH at the time of retransmission. In this case, even when the notification of the priority of the PUSCH at the time of retransmission is not provided by the DCI giving the instruction of retransmission, the priority of the PUSCH at the time of retransmission can be appropriately determined.

[Option 1-2]

The priority of the PUSCH at the time of retransmission may be a fixed value. For example, the priority of the PUSCH at the time of retransmission may be always set to the first priority (for example, High). Alternatively, the priority of the PUSCH at the time of retransmission may be always set to the second priority (for example, Low). The fixed value may be defined in advance in specifications or may be configured by at least one of higher layer signaling and downlink control information from the base station to the UE.

[Option 1-3]

The priority of the PUSCH at the time of retransmission may be determined based on the transmission condition or the transmission parameter of the DCI giving an instruction of retransmission of the configured grant-based PUSCH. For example, when the DCI format 0_0 is transmitted in the common search space (CSS), the first priority may be set to the PUSCH at the time of retransmission, and when the DCI format 0_0 is transmitted in the UE specific search space (USS), the second priority may be set to the PUSCH at the time of retransmission.

Alternatively, when the DCI format 0_0 is transmitted in the CSS, the second priority may be set to the PUSCH at the time of retransmission, and when the DCI format 0_0 is transmitted in the USS, the first priority may be set to the PUSCH at the time of retransmission.

[Option 1-4]

The priority of the PUSCH at the time of retransmission may be determined based on the transmission condition or the transmission parameter of the configured grant-based PUSCH. For example, the priority of the PUSCH at the time of retransmission may be determined based on the number of repeated transmissions (or the repetition factor) applied to the configured grant-based retransmission.

The information about the repetition factor may be included in the DCI giving an instruction of the configured grant-based retransmission. For example, the first priority may be configured to the PUSCH at the time of retransmission when the repetition factor is larger than a given value x (for example, x=1), and the second priority may be configured to the PUSCH at the time of retransmission when the repetition factor is equal to or smaller than x.

Alternatively, the second priority may be configured to the PUSCH at the time of retransmission when the repetition factor is larger than a given value x (for example, x=1), and the first priority may be configured to the PUSCH at the time of retransmission when the repetition factor is equal to or smaller than x.

As described above, in a case where the DCI format does not include the information regarding the priority of the PUSCH at the time of retransmission, the UE may determine the priority based on given information or conditions. As a result, it is possible to appropriately determine the priority at the time of retransmission and suppress a decrease in throughput.

<DCI Format 0_1, 0_2>

The non-fallback DCI (for example, DCI format 0_1) may be configured to be used for notification of the priority of the PUSCH configured in the higher layer signaling, or may be configured not to be used.

A new DCI (for example, DCI format 0_2) may be configured to be always used for notification of the priority of the PUSCH configured in the higher layer signaling. For example, the DCI format 0_2 may always include information regarding the priority.

Alternatively, the DCI format 0_2 may be configured to be used for notification of the priority of the PUSCH configured in the higher layer signaling, or may be configured not to be used.

When the information regarding the priority is not included in the DCI format 0_1 or 0_2, the UE may determine the priority of the PUSCH at the time of retransmission indicated by the DCI format based on at least one of the following options 2-1 to 2-3.

[Option 2-1]

The priority notification of which is provided by the higher layer signaling for configuring the configured grant-based PUSCH (for example, a configured grant-based PUSCH for initial transmission) may be applied to the PUSCH at the time of retransmission. In this case, even when the notification of the priority of the PUSCH at the time of retransmission is not provided by the DCI giving the instruction of retransmission, the priority of the PUSCH at the time of retransmission can be appropriately determined.

[Option 2-2]

The priority of the PUSCH at the time of retransmission may be a fixed value. For example, the priority of the PUSCH at the time of retransmission may be always set to the first priority (for example, High). Alternatively, the priority of the PUSCH at the time of retransmission may be always set to the second priority (for example, Low). The fixed value may be defined in advance in specifications or may be configured by at least one of higher layer signaling and downlink control information from the base station to the UE.

[Option 2-3]

The priority of the PUSCH at the time of retransmission may be determined based on the transmission condition or the transmission parameter of the configured grant-based PUSCH. For example, the priority of the PUSCH at the time of retransmission may be determined based on the number of repeated transmissions (or the repetition factor) applied to the configured grant-based retransmission.

The information about the repetition factor may be included in the DCI giving an instruction of the configured grant-based retransmission. For example, the first priority may be configured to the PUSCH at the time of retransmission when the repetition factor is larger than a given value x (for example, x=1), and the second priority may be configured to the PUSCH at the time of retransmission when the repetition factor is equal to or smaller than x.

Alternatively, the second priority may be configured to the PUSCH at the time of retransmission when the repetition factor is larger than a given value x (for example, x=1), and the first priority may be configured to the PUSCH at the time of retransmission when the repetition factor is equal to or smaller than x.

When the information regarding the priority is included in the DCI format 0_1 or the DCI format 0_2, the UE may apply the priority included in the DCI format as the priority of the PUSCH at the time of retransmission.

(Radio Communication System)

Hereinafter, a configuration of a radio communication system according to one embodiment of the present disclosure will be described. In this radio communication system, communication is performed using one or a combination of the radio communication methods according to the embodiments of the present disclosure.

Figure 4:
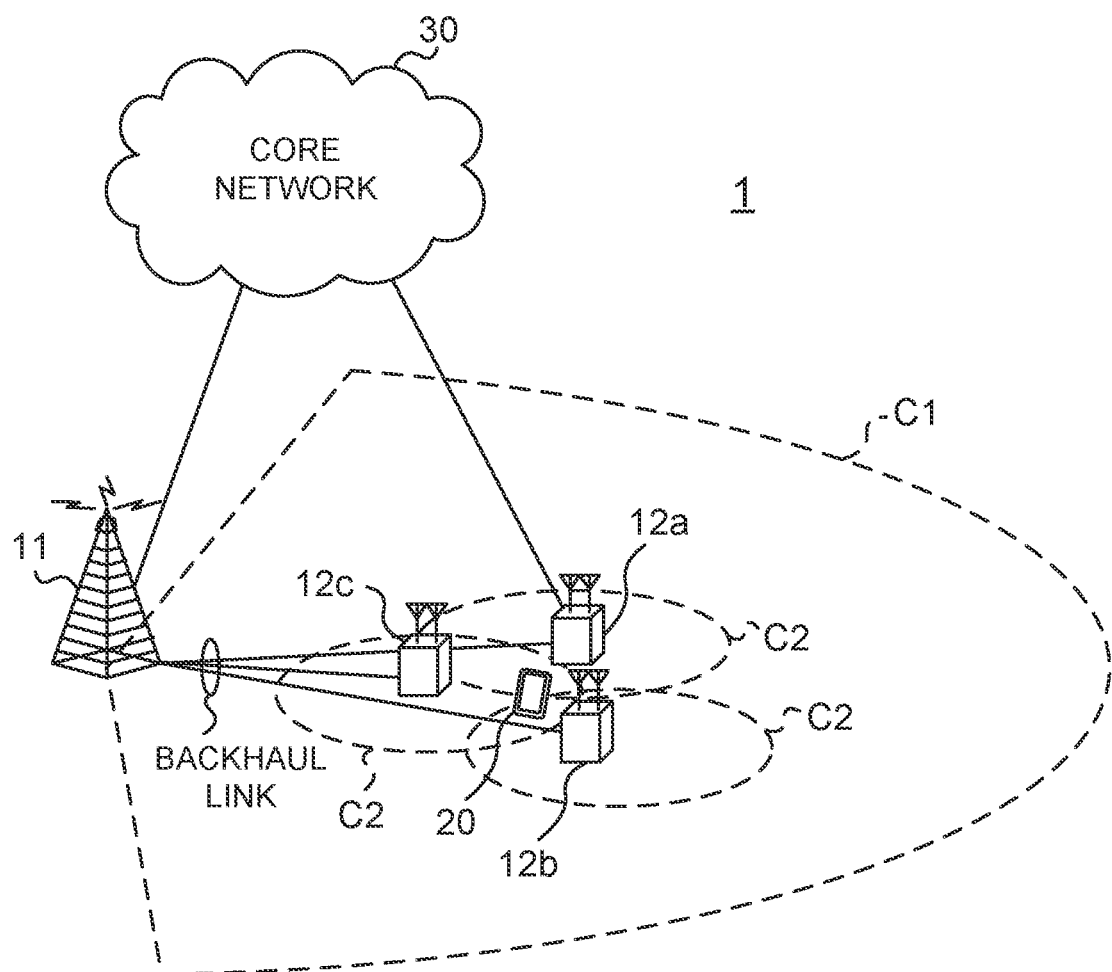
FIG. 4 is a diagram illustrating an example of a schematic configuration of a radio communication system according to an embodiment.

FIG. 4 is a diagram illustrating an example of a schematic configuration of a radio communication system according to an embodiment. A radio communication system 1 may be a system that implements communication using long term evolution (LTE), 5th generation mobile communication system New Radio (5G NR), and the like drafted as the specification by third generation partnership project (3GPP).

Furthermore, the radio communication system 1 may support dual connectivity between a plurality of radio access technologies (RATs) (multi-RAT dual connectivity (MR-DC)). The MR-DC may include dual connectivity between LTE (evolved universal terrestrial radio access (E-UTRA)) and NR (E-UTRA-NR dual connectivity (EN-DC)), dual connectivity between NR and LTE (NR-E-UTRA dual connectivity (NE-DC)), and the like.

In the EN-DC, an LTE (E-UTRA) base station (eNB) is a master node (MN), and an NR base station (gNB) is a secondary node (SN). In the NE-DC, an NR base station (gNB) is MN, and an LTE (E-UTRA) base station (eNB) is SN.

The radio communication system 1 may support dual connectivity between a plurality of base stations in the same RAT (for example, dual connectivity in which both MN and SN are NR base stations (gNB) (NR-NR dual connectivity (NN-DC)).

The radio communication system 1 may include a base station 11 that forms a macro cell C1 with a relatively wide coverage, and base stations 12 (12a to 12c) that are arranged in the macro cell C1 and that form small cells C2 narrower than the macro cell C1. A user terminal 20 may be positioned in at least one cell. The arrangement, number, and the like of cells and the user terminals 20 are not limited to the aspects illustrated in the drawings. Hereinafter, the base stations 11 and 12 will be collectively referred to as "base stations 10", unless these are distinguished from each other.

The user terminal 20 may be connected to at least one of the plurality of base stations 10. The user terminal 20 may use at least one of carrier aggregation (CA) using a plurality of component carriers (CC) and dual connectivity (DC).

Each CC may be included in at least one of a first frequency range (frequency range 1 (FR1)) and a second frequency range (frequency range 2 (FR2)). The macro cell C1 may be included in FR1, and the small cell C2 may be included in FR2. For example, FR1 may be a frequency range of 6 GHz or less (sub-6 GHz), and FR2 may be a frequency range higher than 24 GHz (above-24 GHz). Note that the frequency ranges, definitions, and the like of the FR1 and FR2 are not limited thereto, and, for example, FR1 may correspond to a frequency range higher than FR2.

Further, the user terminal 20 may perform communication on each CC using at least one of time division duplex (TDD) and frequency division duplex (FDD).

The plurality of base stations 10 may be connected to each other in a wired manner (for example, an optical fiber, an X2 interface, or the like in compliance with common public radio interface (CPRI)) or in a wireless manner (for example, NR communication). For example, when NR communication is used as a backhaul between the base stations 11 and 12, the base station 11 corresponding to a higher-level station may be referred to as an integrated access backhaul (IAB) donor, and the base station 12 corresponding to a relay station (relay) may be referred to as an IAB node.

The base station 10 may be connected to a core network 30 via another base station 10 or directly. The core network 30 may include, for example, at least one of evolved packet core (EPC), 5G core network (5GCN), next generation core (NGC), and the like.

The user terminal 20 may be a terminal corresponding to at least one of communication methods such as LTE, LTE-A, and 5G.

In the radio communication system 1, a radio access method based on orthogonal frequency division multiplexing (OFDM) may be used. For example, in at least one of downlink (DL) and uplink (UL), cyclic prefix OFDM (CP-OFDM), discrete Fourier transform spread OFDM (DFT-s-OFDM), orthogonal frequency division multiple access (OFDMA), single carrier frequency division multiple access (SC-FDMA), and the like may be used.

The radio access method may be referred to as a waveform. Note that, in the radio communication system 1, another radio access method (for example, another single carrier transmission method or another multi-carrier transmission method) may be used as the UL and DL radio access methods.

In the radio communication system 1, a downlink shared channel (physical downlink shared channel (PDSCH)) shared by the user terminals 20, a broadcast channel (physical broadcast channel (PBCH)), a downlink control channel (physical downlink control channel (PDCCH)), and the like may be used as downlink channels.

In the radio communication system 1, an uplink shared channel (physical uplink shared channel (PUSCH)) shared by the user terminals 20, an uplink control channel (physical uplink control channel (PUCCH)), a random access channel (physical random access channel (PRACH)), and the like may be used as uplink channels.

User data, higher layer control information, a system information block (SIB), and the like are transmitted on the PDSCH. User data, higher layer control information, and the like may be transmitted on the PUSCH. Furthermore, a master information block (MIB) may be transmitted on the PBCH.

Lower layer control information may be transmitted on the PDCCH. The lower layer control information may include, for example, downlink control information (DCI) including scheduling information of at least one of the PDSCH and the PUSCH.

Note that, the DCI for scheduling the PDSCH may be referred to as DL assignment, DL DCI, or the like, and the DCI for scheduling the PUSCH may be referred to as UL grant, UL DCI, or the like. Note that, the PDSCH may be replaced with DL data, and the PUSCH may be replaced with UL data.

For detection of the PDCCH, a control resource set (CORESET) and a search space may be used. The CORESET corresponds to a resource that searches for DCI. The search space corresponds to a search area and a search method for PDCCH candidates. One CORESET may be associated with one or more search spaces. The UE may monitor the CORESET associated with a given search space based on search space configuration.

One search space may correspond to a PDCCH candidate corresponding to one or more aggregation levels. One or more search spaces may be referred to as a search space set. Note that the terms "search space", "search space set", "search space configuration", "search space set configuration", "CORESET", "CORESET configuration", and the like in the present disclosure may be replaced with each other.

Uplink control information (UCI) including at least one of channel state information (CSI), delivery acknowledgement information (which may be referred to as, for example, hybrid automatic repeat request acknowledgement (HARQ-ACK), ACK/NACK, or the like), and scheduling request (SR) may be transmitted on the PUCCH. A random access preamble for establishing connection with a cell may be transmitted on the PRACH.

Note that, in the present disclosure, downlink, uplink, and the like may be expressed without "link". Furthermore, various channels may be expressed without adding "physical" at the beginning thereof.

In the radio communication system 1, a synchronization signal (SS), a downlink reference signal (DL-RS), and the like may be transmitted. In the radio communication system 1, a cell-specific reference signal (CRS), a channel state information reference signal (CSI-RS), a demodulation reference signal (DMRS), a positioning reference signal (PRS), a phase tracking reference signal (PTRS), or the like may be transmitted as the DL-RS.

The synchronization signal may be, for example, at least one of a primary synchronization signal (PSS) and a secondary synchronization signal (SSS). A signal block including the SS (PSS or SSS) and the PBCH (and the DMRS for the PBCH) may be referred to as an SS/PBCH block, an SS block (SSB), or the like. Note that, the SS, the SSB, or the like may also be referred to as a reference signal.

Furthermore, in the radio communication system 1, a measurement reference signal (sounding reference signal (SRS)), a demodulation reference signal (DMRS), or the like may be transmitted as an uplink reference signal (UL-RS). Note that, DMRSs may be referred to as "user terminal-specific reference signals (UE-specific Reference Signals)."

(Base Station)

Figure 5:
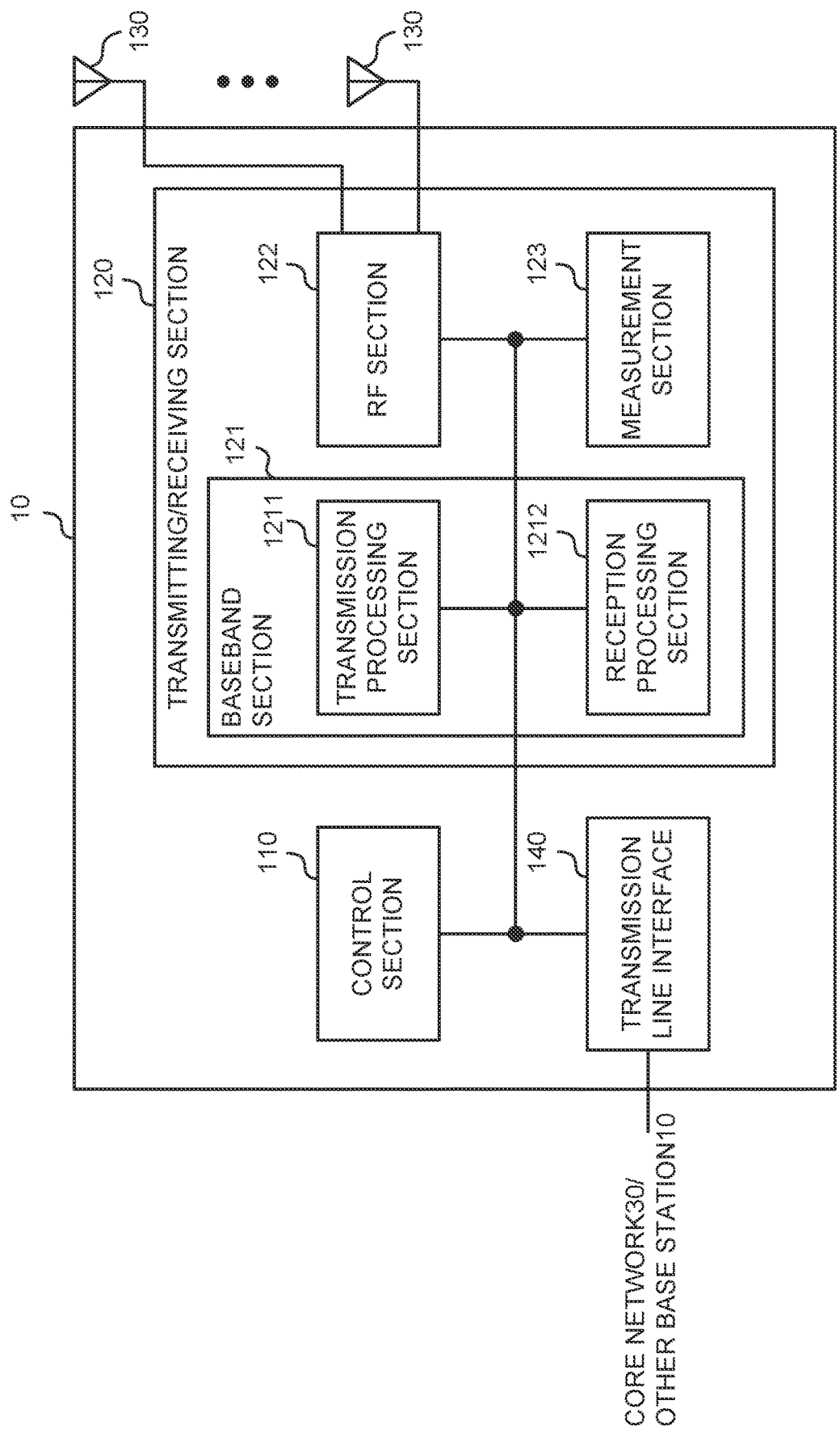
FIG. 5 is a diagram illustrating an example of a configuration of a base station according to an embodiment.

FIG. 5 is a diagram illustrating an example of a configuration of a base station according to an embodiment. The base station 10 includes a control section 110, a transmitting/receiving section 120, a transmission/reception antenna 130, and a transmission line interface 140. Note that one or more control sections 110, one or more transmitting/receiving sections 120, one or more transmission/reception antennas 130, and one or more transmission line interfaces 140 may be provided.

Note that, although this example mainly describes functional blocks of a characteristic part of the present embodiment, it may be assumed that the base station 10 includes other functional blocks that are necessary for radio communication as well. A part of processing performed by each section described below may be omitted.

The control section 110 controls the entire base station 10. The control section 110 can include a controller, a control circuit, and the like, which are described based on common recognition in the technical field related to the present disclosure.

The control section 110 may control signal generation, scheduling (for example, resource allocation or mapping), and the like. The control section 110 may control transmission/reception, measurement, and the like using the transmitting/receiving section 120, the transmission/reception antenna 130, and the transmission line interface 140. The control section 110 may generate data to be transmitted as a signal, control information, a sequence, and the like, and may transfer the data, the control information, the sequence, and the like to the transmitting/receiving section 120. The control section 110 may perform call processing (such as configuration or releasing) of a communication channel, state management of the base station 10, and management of a radio resource.

The transmitting/receiving section 120 may include a baseband section 121, a radio frequency (RF) section 122, and a measurement section 123. The baseband section 121 may include a transmission processing section 1211 and a reception processing section 1212. The transmitting/receiving section 120 can include a transmitter/receiver, an RF circuit, a baseband circuit, a filter, a phase shifter, a measurement circuit, a transmission/reception circuit, and the like that are described based on common recognition in the technical field related to the present disclosure.

The transmitting/receiving section 120 may be configured as an integrated transmitting/receiving section, or may include a transmitting section and a receiving section. The transmitting section may include the transmission processing section 1211 and the RF section 122. The receiving section may include the reception processing section 1212, the RF section 122, and the measurement section 123.

The transmission/reception antenna 130 can include an antenna, which is described based on common recognition in the technical field related to the present disclosure, for example, an array antenna.

The transmitting/receiving section 120 may transmit the above-described downlink channel, synchronization signal, downlink reference signal, and the like. The transmitting/receiving section 120 may receive the above-described uplink channel, uplink reference signal, and the like.

The transmitting/receiving section 120 may form at least one of a Tx beam and a reception beam by using digital beam forming (for example, precoding), analog beam forming (for example, phase rotation), and the like.

The transmitting/receiving section 120 (transmission processing section 1211) may perform packet data convergence protocol (PDCP) layer processing, radio link control (RLC) layer processing (for example, RLC retransmission control), medium access control (MAC) layer processing (for example, HARQ retransmission control), and the like on, for example, data, control information, and the like acquired from the control section 110, to generate a bit string to be transmitted.

The transmitting/receiving section 120 (transmission processing section 1211) may perform transmission processing such as channel encoding (which may include error correction encoding), modulation, mapping, filtering processing, discrete Fourier transform (DFT) processing (if necessary), inverse fast Fourier transform (IFFT) processing, precoding, or digital-analog conversion on the bit string to be transmitted, to output a baseband signal.

The transmitting/receiving section 120 (RF section 122) may perform modulation to a radio frequency range, filtering processing, amplification, and the like on the baseband signal, and may transmit a signal in the radio frequency range via the transmission/reception antenna 130.

Meanwhile, the transmitting/receiving section 120 (RF section 122) may perform amplification, filtering processing, demodulation to a baseband signal, and the like on the signal in the radio frequency range received by the transmission/reception antenna 130.

The transmitting/receiving section 120 (reception processing section 1212) may apply reception processing such as analog-digital conversion, fast Fourier transform (FFT) processing, inverse discrete Fourier transform (IDFT) processing (if necessary), filtering processing, demapping, demodulation, decoding (which may include error correction decoding), MAC layer processing, RLC layer processing, or PDCP layer processing on the acquired baseband signal, to acquire user data and the like.

The transmitting/receiving section 120 (measurement section 123) may perform measurement on the received signal. For example, the measurement section 123 may perform radio resource management (RPM) measurement, channel state information (CSI) measurement, and the like based on the received signal. The measurement section 123 may measure received power (for example, reference signal received power (RSRP)), received quality (for example, reference signal received quality (RSRQ), a signal to interference plus noise ratio (SINR), a signal to noise ratio (SNR)), signal strength (for example, received signal strength indicator (RSSI)), propagation path information (for example, CSI), and the like. The measurement result may be output to the control section 110.

The transmission line interface 140 may perform transmission/reception of a signal (backhaul signaling) to/from an apparatus included in the core network 30, another base station 10, or the like, and may perform acquisition, transmission, or the like of user data (user plane data), control plane data, and the like for the user terminal 20.

Note that, the transmitting section and the receiving section of the base station 10 in the present disclosure may include at least one of the transmitting/receiving section 120, the transmission/reception antenna 130, and the transmission line interface 140.

The transmitting/receiving section 120 receives a configured grant-based uplink shared channel. In addition, the transmitting/receiving section 120 transmits downlink control information that gives an instruction of (or schedules) retransmission of the uplink shared channel.

The control section 110 controls a retransmission instruction of the configured grant-based uplink shared channel.

(User Terminal)

Figure 6:
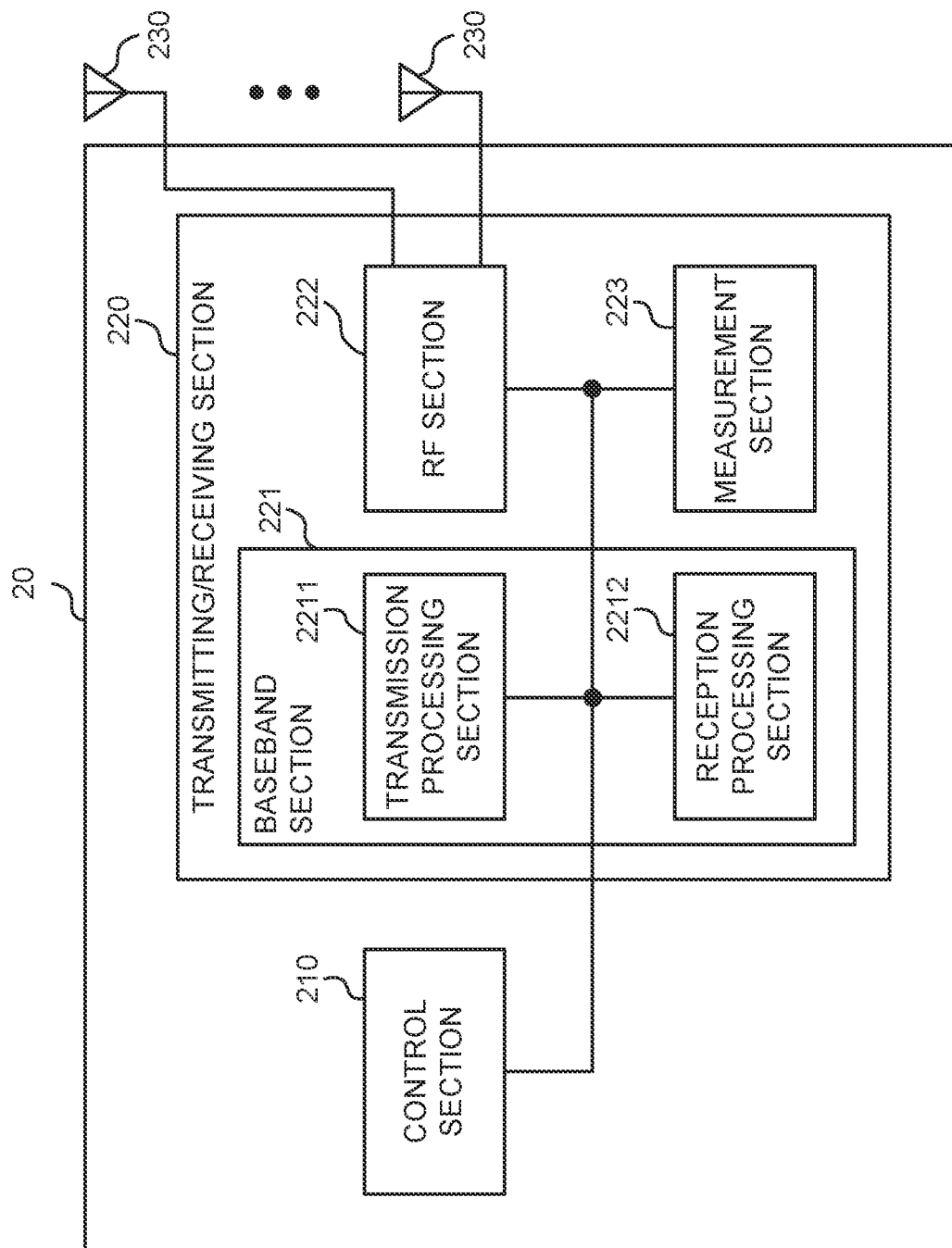
FIG. 6 is a diagram illustrating an example of a configuration of a user terminal according to an embodiment.

FIG. 6 is a diagram illustrating an example of a configuration of a user terminal according to an embodiment. The user terminal 20 includes a control section 210, a transmitting/receiving section 220, and a transmission/reception antenna 230. Note that one or more control sections 210, one or more transmitting/receiving sections 220, and one or more transmission/reception antennas 230 may be provided.

Note that, although this example mainly describes functional blocks of a characteristic part of the present embodiment, it may be assumed that the user terminal 20 includes other functional blocks that are necessary for radio communication as well. A part of processing performed by each section described below may be omitted.

The control section 210 controls the entire user terminal 20. The control section 210 can include a controller, a control circuit, and the like, which are described based on common recognition in the technical field related to the present disclosure.

The control section 210 may control signal generation, mapping, and the like. The control section 210 may control transmission/reception, measurement, and the like using the transmitting/receiving section 220 and the transmission/reception antenna 230. The control section 210 may generate data to be transmitted as a signal, control information, a sequence, and the like, and may transfer the data, the control information, the sequence, and the like to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can include a transmitter/receiver, an RF circuit, a baseband circuit, a filter, a phase shifter, a measurement circuit, a transmission/reception circuit, and the like, which are described based on common recognition in the technical field related to the present disclosure.

The transmitting/receiving section 220 may be configured as an integrated transmitting/receiving section, or may include a transmitting section and a receiving section. The transmitting section may include the transmission processing section 2211 and the RF section 222. The receiving section may include the reception processing section 2212, the RF section 222, and the measurement section 223.

The transmission/reception antenna 230 can include an antenna, which is described based on common recognition in the technical field related to the present disclosure, for example, an array antenna.

The transmitting/receiving section 220 may receive the above-described downlink channel, synchronization signal, downlink reference signal, and the like. The transmitting/receiving section 220 may transmit the above-described uplink channel, uplink reference signal, and the like.

The transmitting/receiving section 220 may form at least one of a Tx beam and a reception beam by using digital beam forming (for example, precoding), analog beam forming (for example, phase rotation), and the like.

The transmitting/receiving section 220 (transmission processing section 2211) may perform PDCP layer processing, RLC layer processing (for example, RLC retransmission control), MAC layer processing (for example, HARQ retransmission control), and the like on, for example, data, control information, or the like acquired from the control section 210 to generate a bit string to be transmitted.

The transmitting/receiving section 220 (transmission processing section 2211) may perform transmission processing such as channel encoding (which may include error correction encoding), modulation, mapping, filtering processing, DFT processing (if necessary), IFFT processing, precoding, or digital-analog conversion on the bit string to be transmitted, to output a baseband signal.

Note that whether or not to apply DFT processing may be determined based on configuration of transform precoding. When transform precoding is enabled for a channel (for example, PUSCH), the transmitting/receiving section 220 (transmission processing section 2211) may perform DFT processing as the above-described transmission processing in order to transmit the channel by using a DFT-s-OFDM waveform, and if not, the DFT processing does not have to be performed as the transmission processing.

The transmitting/receiving section 220 (RF section 222) may perform modulation to a radio frequency range, filtering processing, amplification, and the like on the baseband signal, and may transmit a signal in the radio frequency range via the transmission/reception antenna 230.

Meanwhile, the transmitting/receiving section 220 (RF section 222) may perform amplification, filtering processing, demodulation to a baseband signal, and the like on the signal in the radio frequency range received by the transmission/reception antenna 230.

The transmitting/receiving section 220 (reception processing section 2212) may apply reception processing such as analog-digital conversion, FFT processing, IDFT processing (if necessary), filtering processing, demapping, demodulation, decoding (which may include error correction decoding), MAC layer processing, RLC layer processing, or PDCP layer processing on the acquired baseband signal to acquire user data and the like.

The transmitting/receiving section 220 (measurement section 223) may perform measurement on the received signal. For example, the measurement section 223 may perform RRM measurement, CSI measurement, and the like based on the received signal. The measurement section 223 may measure received power (for example, RSRP), received quality (for example, RSRQ, SINR, or SNR), signal strength (for example, RSSI), propagation path information (for example, CSI), and the like. The measurement result may be output to the control section 210.

Note that the transmitting section and the receiving section of the user terminal 20 in the present disclosure may include at least one of the transmitting/receiving section 220 and the transmission/reception antenna 230.

Note that the transmitting/receiving section 220 transmits a configured grant-based uplink shared channel. In addition, the transmitting/receiving section 220 receives downlink control information that gives an instruction of retransmission of the configured grant-based uplink shared channel. In addition, the transmitting/receiving section 220 may receive information regarding the priority in the case of retransmitting the configured grant-based uplink shared channel.

The control section 210 controls retransmission based on the priority configured for retransmission of the configured grant-based uplink shared channel.

For example, the control section 210 may determine the priority based on higher layer signaling configured for the configured grant-based uplink shared channel. Alternatively, the control section 210 may determine the priority based on the downlink control information. Alternatively, the control section 210 may apply a specific priority as the priority. Alternatively, the control section 210 may determine the priority based on the transmission parameter of the uplink shared channel to be retransmitted.

(Hardware Configuration)

Note that the block diagrams that have been used to describe the above embodiments illustrate blocks in functional units. These functional blocks (components) may be implemented in arbitrary combinations of at least one of hardware and software. Further, the method for implementing each functional block is not particularly limited. That is, each functional block may be implemented by a single apparatus physically or logically aggregated, or may be implemented by directly or indirectly connecting two or more physically or logically separate apparatuses (in a wired manner, a wireless manner, or the like, for example) and using these apparatuses. The functional blocks may be implemented by combining software with the above-described single apparatus or the above-described plurality of apparatuses.

Here, the functions include, but are not limited to, determining, judging, computing, calculating, processing, deriving, investigating, searching, ascertaining, receiving, transmitting, outputting, accessing, resolving, selecting, choosing, establishing, comparing, assuming, expecting, considering, broadcasting, notifying, communicating, forwarding, configuring, reconfiguring, allocating, mapping, and assigning. For example, a functional block (component) that has a transmission function may be referred to as a transmitting section (transmitting unit), a transmitter, and the like. In any case, as described above, the implementation method is not particularly limited.

Figure 7:
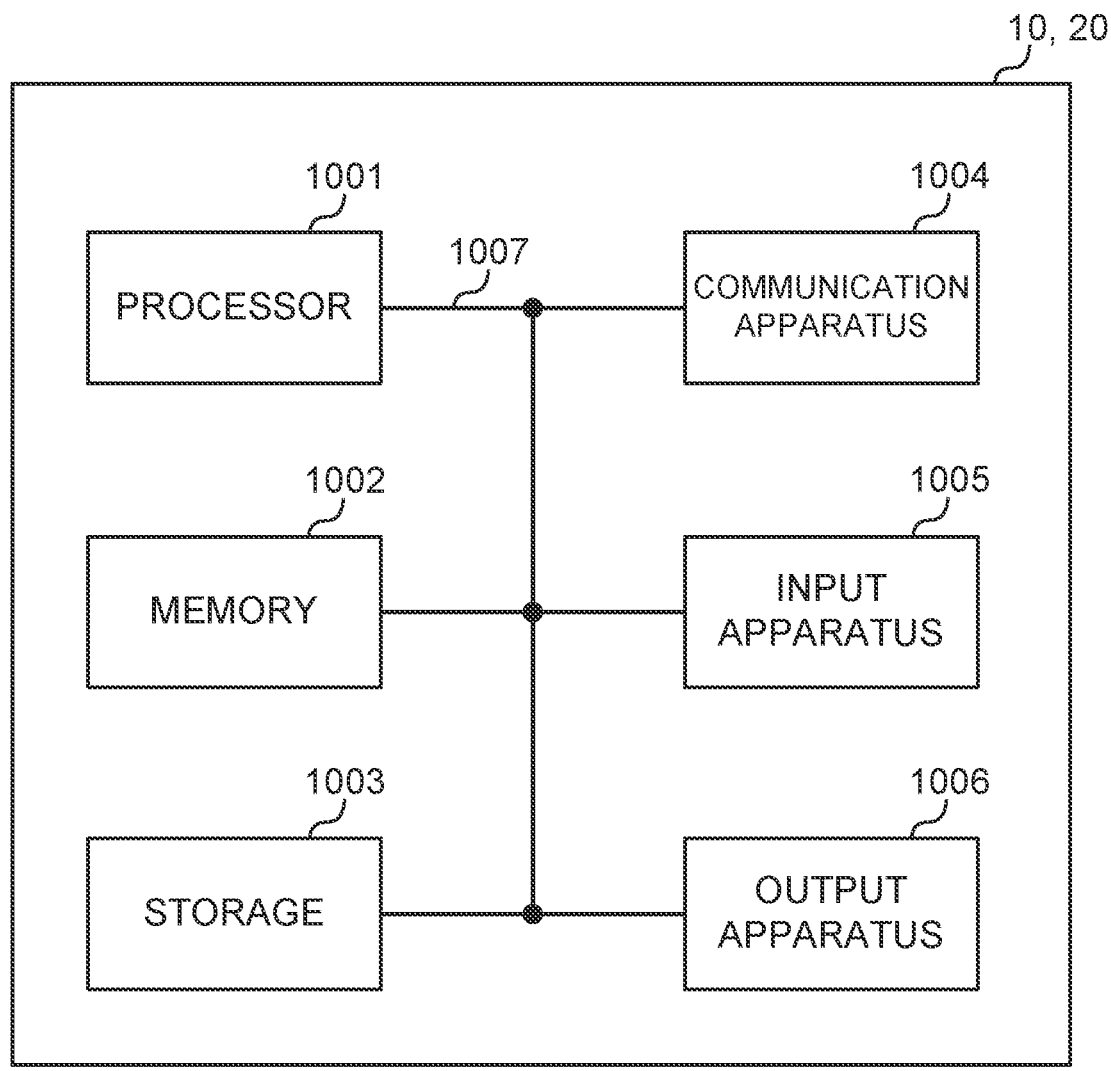
FIG. 7 is a diagram illustrating an example of a hardware configuration of the base station and the user terminal according to an embodiment.

For example, the base station, the user terminal, or the like according to one embodiment of the present disclosure may function as a computer that executes the processing of the radio communication method in the present disclosure. FIG. 7 is a diagram illustrating an example of a hardware configuration of the base station and the user terminal according to an embodiment. Physically, the above-described base station 10 and user terminal 20 may be configured as a computer apparatus that includes a processor 1001, a memory 1002, a storage 1003, a communication apparatus 1004, an input apparatus 1005, an output apparatus 1006, a bus 1007, and the like.

Note that in the present disclosure, the terms such as an apparatus, a circuit, a device, a section, or a unit are interchangeable. The hardware configuration of the base station 10 and the user terminal 20 may include one or more apparatuses illustrated in the drawings, or does not have to include some apparatuses.

For example, although only one processor 1001 is illustrated, a plurality of processors may be provided. Further, the processing may be executed by one processor, or the processing may be executed by two or more processors simultaneously or sequentially, or by using other methods. Note that the processor 1001 may be implemented by one or more chips.

Each of the functions of the base station 10 and the user terminal 20 is implemented by causing given software (program) to be read on hardware such as the processor 1001 or the memory 1002, thereby causing the processor 1001 to perform operation, controlling communication via the communication apparatus 1004, and controlling at least one of reading and writing of data from and in the memory 1002 and the storage 1003.

The processor 1001 may control the whole computer by, for example, running an operating system. The processor 1001 may be configured by a central processing unit (CPU) including an interface with peripheral equipment, a control apparatus, an operation apparatus, a register, and the like. For example, at least a part of the above-described control section 110 (210), transmitting/receiving section 120 (220), and the like may be implemented by the processor 1001.

Further, the processor 1001 reads a program (program code), a software module, data, and the like from at least one of the storage 1003 and the communication apparatus 1004 into the memory 1002, and performs various types of processing according to them. As the program, a program that causes a computer to execute at least a part of the operation described in the above-described embodiment is used. For example, the control section 110 (210) may be implemented by a control program that is stored in the memory 1002 and is operated in the processor 1001, and other functional blocks may be implemented similarly.

The memory 1002 is a computer-readable recording medium, and may be implemented by, for example, at least one of a read only memory (ROM), an erasable programmable ROM (EPROM), an electrically EPROM (EEPROM), a random access memory (RAM), and/or other appropriate storage media. The memory 1002 may be referred to as a register, a cache, a main memory (primary storage apparatus), and the like. The memory 1002 can store a program (program code), a software module, and the like, which are executable for implementing the radio communication method according to an embodiment of the present disclosure.

The storage 1003 is a computer-readable recording medium, and may be implemented by, for example, at least one of a flexible disk, a floppy (registered trademark) disk, a magneto-optical disk (for example, a compact disc ROM (CD-ROM) and the like), a digital versatile disc, a Blu-ray (registered trademark) disk), a removable disk, a hard disk drive, a smart card, a flash memory device (for example, a card, a stick, a key drive), a magnetic stripe, a database, a server, and/or other appropriate storage media. The storage 1003 may be referred to as an auxiliary storage device.

The communication apparatus 1004 is hardware (transmission/reception device) for performing inter-computer communication via at least one of a wired network and a radio network, and is referred to as, for example, a network device, a network controller, a network card, and a communication module. The communication apparatus 1004 may include a high frequency switch, a duplexer, a filter, a frequency synthesizer, and the like in order to implement, for example, at least one of frequency division duplex (FDD) and time division duplex (TDD). For example, the transmitting/receiving section 120 (220), the transmission/reception antenna 130 (230), and the like described above may be implemented by the communication apparatus 1004. The transmitting/receiving section 120 (220) may be implemented by a transmission section 120a (220a) and a reception section 120b (220b) physically or logically separated from each other.

The input apparatus 1005 is an input device that receives an input from the outside (for example, a keyboard, a mouse, a microphone, a switch, a button, a sensor, and the like). The output apparatus 1006 is an output device that performs output to the outside (for example, a display, a speaker, a light emitting diode (LED) lamp, or the like). Note that the input apparatus 1005 and the output apparatus 1006 may be provided in an integrated structure (for example, a touch panel).

Further, the respective apparatuses such as the processor 1001 and the memory 1002, are connected by the bus 1007 to communicate information. The bus 1007 may be formed by using a single bus, or may be formed by using different buses for respective connections between apparatuses.

Further, the base station 10 and the user terminal 20 may include hardware such as a microprocessor, a digital signal processor (DSP), an application specific integrated circuit (ASIC), a programmable logic device (PLD), or a field programmable gate array (FPGA), and some or all of the functional blocks may be implemented by the hardware. For example, the processor 1001 may be implemented by using at least one of these pieces of hardware.

Modified Example

Note that terms described in the present disclosure and terms necessary for understanding the present disclosure may be replaced with terms that have the same or similar meanings. For example, a channel, a symbol, and a signal (signal or signaling) may be replaced with each other. Further, the signal may be a message. The reference signal can be abbreviated as an RS, and may be referred to as a pilot, a pilot signal, and the like, depending on which standard applies. Furthermore, a component carrier (CC) may be referred to as a cell, a frequency carrier, a carrier frequency, and the like.

A radio frame may include one or more periods (frames) in a time domain. Each of the one or more periods (frames) included in the radio frame may be referred to as a subframe. Further, the subframe may include one or more slots in the time domain. The subframe may be a fixed time duration (for example, 1 ms) that is not dependent on numerology.

Here, the numerology may be a communication parameter used for at least one of transmission and reception of a given signal or channel. The numerology may indicate at least one of, for example, a subcarrier spacing (SCS), a bandwidth, a symbol length, a cyclic prefix length, a transmission time interval (TTI), the number of symbols per TTI, a radio frame configuration, specific filtering processing performed by a transceiver in a frequency domain, and a specific windowing processing performed by the transceiver in a time domain.

The slot may include one or more symbols (for example, orthogonal frequency division multiplexing (OFDM) symbol and single carrier frequency division multiple access (SC-FDMA) symbol) in the time domain. Further, the slot may be a time unit based on the numerology.

The slot may include a plurality of mini slots. Each mini slot may include one or more symbols in the time domain. Further, the mini slot may be referred to as a sub-slot. Each mini slot may include fewer symbols than the slot. A PDSCH (or PUSCH) transmitted in a time unit larger than the mini slot may be referred to as "PDSCH (PUSCH) mapping type A". The PDSCH (or PUSCH) transmitted using the mini slot may be referred to as PDSCH (PUSCH) mapping type B.

The radio frame, the subframe, the slot, the mini slot, and the symbol all represent the time unit in signal transmission. The radio frame, the subframe, the slot, the mini slot, and the symbol may be called by other applicable names, respectively. Note that time units such as the frame, the subframe, the slot, the mini slot, and the symbol in the present disclosure may be replaced with each other.

For example, one subframe may be referred to as TTI. A plurality of consecutive subframes may be referred to as TTI. One slot or one mini slot may be referred to as TTI. That is, at least one of the subframe and the TTI may be a subframe (1 ms) in the existing LTE, may be a period shorter than 1 ms (for example, one to thirteen symbols), or may be a period longer than 1 ms. Note that a unit that represents the TTI may be referred to as the slot, the mini slot, and the like, instead of the subframe.

Here, the TTI refers to the minimum time unit of scheduling in radio communication, for example. For example, in the LTE system, a base station performs scheduling to allocate radio resources (a frequency bandwidth, transmit power, and the like that can be used in each user terminal) to each user terminal in TTI units. Note that the definition of the TTI is not limited thereto.

The TTI may be a transmission time unit of channel-encoded data packets (transport blocks), code blocks, codewords, or the like, or may be a processing unit in scheduling, link adaptation, or the like. Note that, when the TTI is given, a time interval (for example, the number of symbols) to which the transport block, code block, codeword, or the like is actually mapped may be shorter than the TTI.

Note that, when one slot or one mini slot is referred to as the TTI, one or more TTIs (that is, one or more slots or one or more mini slots) may be the minimum time unit of scheduling. Further, the number of slots (the number of mini slots) constituting the minimum time unit of scheduling may be controlled.

A TTI having a time duration of 1 ms may be referred to as a usual TTI (TTI in 3GPP Rel. 8 to 12), a normal TTI, a long TTI, a usual subframe, a normal subframe, a long subframe, a slot, and the like. A TTI that is shorter than the usual TTI may be referred to as a shortened TTI, a short TTI, a partial TTI (or fractional TTI), a shortened subframe, a short subframe, a mini slot, a subslot, a slot, and the like.

Note that a long TTI (for example, a normal TTI, a subframe, or the like) may be interchangeable with a TTI having a time duration exceeding 1 ms, and a short TTI (for example, a shortened TTI) may be interchangeable with a TTI having a TTI duration less than the TTI duration of the long TTI and not less than 1 ms.

The resource block (RB) is the unit of resource allocation in the time domain and the frequency domain, and may include one or more consecutive subcarriers in the frequency domain. The number of subcarriers included in the RB may be the same regardless of the numerology, and may be twelve, for example. The number of subcarriers included in the RB may be determined based on the numerology.

Further, the RB may include one or more symbols in the time domain, and may have a length of one slot, one mini slot, one subframe, or one TTI. One TTI, one subframe, and the like may each include one or more resource blocks.

Note that one or more RBs may be referred to as a physical resource block (PRB (Physical RB)), a subcarrier group (SCG (Sub-Carrier Group)), a resource element group (REG), a PRB pair, an RB pair, or the like.

Furthermore, a resource block may include one or more resource elements (REs). For example, one RE may be a radio resource field of one subcarrier and one symbol.

The bandwidth part (BWP) (which may also be referred to as a partial bandwidth or the like) may represent a subset of consecutive common resource blocks (RBs) for given numerology in a given carrier. Here, the common RB may be specified by the index of the RB based on a common reference point of the carrier. The PRB may be defined in a given BWP and be numbered within the BWP.

The BWP may include a BWP for UL (UL BWP) and a BWP for DL (DL BWP). For the UE, one or more BWPs may be configured within one carrier.

At least one of the configured BWPs may be active, and it does not have to be assumed that the UE transmits and receives a given signal/channel outside the active BWP. Note that a "cell", a "carrier", or the like in the present disclosure may be interchangeable with the "BWP".

Note that the structures of the above-described radio frame, subframe, slot, mini slot, symbol, and the like are merely examples. For example, configurations such as the number of subframes included in a radio frame, the number of slots per subframe or radio frame, the number of mini slots included in a slot, the number of symbols and RBs included in a slot or a mini slot, the number of subcarriers included in an RB, the number of symbols in a TTI, the symbol duration, the length of cyclic prefix (CP), and the like can be variously changed.

Further, the information, parameters, and the like described in the present disclosure may be represented using absolute values or relative values with respect to given values, or may be represented using other corresponding information. For example, the radio resource may be specified by a given index.

The names used for parameters and the like in the present disclosure are in no respect limitative. Further, any mathematical expression or the like that uses these parameters may differ from those explicitly disclosed in the present disclosure. Various channels (PUCCH, PDCCH, and the like) and information elements can be identified by any suitable names. Therefore, various names allocated to these various channels and information elements are in no respect limitative.

The information, a signal, and the like described in the present disclosure may be represented by using any of a variety of different technologies. For example, data, an instruction, a command, information, a signal, a bit, a symbol, a chip, or the like that may be mentioned throughout the above description may be represented by a voltage, a current, an electromagnetic wave, a magnetic field or magnetic particles, an optical field or photons, or an arbitrary combination thereof.

Further, information, a signal, and the like can be output in at least one of a direction from a higher layer to a lower layer and a direction from a lower layer to a higher layer. Information, a signal, and the like may be input/output via a plurality of network nodes.

The input and/or output information, signal, and the like can be stored in a specific location (for example, a memory) or can be managed using a management table. The information, signals, and the like to be input and output can be overwritten, updated, or appended. The output information, signals, and the like may be deleted. The input information, signal, and the like may be transmitted to another apparatus.

Notification of information may be performed not only by using the aspects/embodiments described in the present disclosure but also using another method. For example, the notification of information in the present disclosure may be performed using physical layer signaling (e.g., downlink control information (DCI), uplink control information (UCI), higher layer signaling (e.g., radio resource control (RRC) signaling, broadcast information (master information block (MIB), system information block (SIB), or the like), medium access control (MAC) signaling, another signal, or a combination thereof.

Note that physical layer signaling may be referred to as Layer 1/Layer 2 (L1/L2) control information (L1/L2 control signals), L1 control information (L1 control signal), or the like. Further, the RRC signaling may be referred to as an RRC message, and may be, for example, an RRC connection setup message, an RRC connection reconfiguration message, and the like. Further, notification of MAC signaling may be performed using, for example, a MAC control element (MAC CE).

Further, notification of given information (e.g., notification of "being X") is not limited to explicit notification but may be performed implicitly (for example, by not performing notification of the given information or by performing notification of another piece of information).

Judging may be performed using values represented by one bit (0 or 1), may be performed using Boolean values represented by true or false, or may be performed by comparing numerical values (for example, comparison with a given value).

Regardless of whether software is referred to as software, firmware, middleware, microcode, or hardware description language, or referred to as other names, this should be interpreted broadly, to mean an instruction, an instruction set, a code, a code segment, a program code, a program, a subprogram, a software module, an application, a software application, a software package, a routine, a subroutine, an object, an executable file, an execution thread, a procedure, a function, and the like.

Further, software, instruction, information, and the like may be transmitted/received via a transmission medium. For example, when software is transmitted from a website, a server, or other remote sources by using at least one of wired technology (a coaxial cable, an optical fiber cable, a twisted-pair cable, a digital subscriber line (DSL), and the like) and wireless technology (infrared light, microwaves, and the like), at least one of the wired technology and the wireless technology is included in the definition of the transmission medium.

The terms "system" and "network" used in the present disclosure can be used interchangeably. The "network" may mean an apparatus (for example, the base station) included in the network.

In the present disclosure, terms such as "precoding", "precoder", "weight (precoding weight)", "quasi-co-location (QCL)", "transmission configuration indication state (TCI state)", "spatial relation", "spatial domain filter", "transmission power", "phase rotation", "antenna port", "antenna port group", "layer", "number of layers", "rank", "resource", "resource set", "resource group", "beam", "beam width", "beam angle", "antenna", "antenna element", and "panel" can be used interchangeably.

In the present disclosure, the terms such as "base station (BS)", "radio base station", "fixed station", "NodeB", "eNodeB (eNB)", "gNodeB (gNB)", "access point", "transmission point (TP)", "reception point (RP)", "transmission/reception point (TRP)", "panel", "cell", "sector", "cell group", "carrier", and "component carrier" can be used interchangeably. The base station may be referred to as a term such as a macro cell, a small cell, a femto cell, or a pico cell.

The base station can accommodate one or more (for example, three) cells. In a case where the base station accommodates a plurality of cells, the entire coverage area of the base station can be partitioned into a plurality of smaller areas, and each smaller area can provide communication services through a base station subsystem (for example, small remote radio head (RRH) for indoors). The term "cell" or "sector" refers to a part or the whole of a coverage area of at least one of a base station and a base station subsystem that performs a communication service in this coverage.

In the present disclosure, the terms such as "mobile station (MS)", "user terminal", "user equipment (UE)", and "terminal" can be used interchangeably.

The mobile station may be referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or other appropriate terms.

At least one of the base station and the mobile station may be referred to as a transmission apparatus, a reception apparatus, a radio communication apparatus, and the like. Note that at least one of the base station and the mobile station may be a device mounted on a moving object, a moving object itself, and the like. The moving object may be a transportation (for example, a car, an airplane, or the like), an unmanned moving object (for example, a drone, an autonomous car, or the like), or a (manned or unmanned) robot. Note that at least one of the base station and the mobile station also includes an apparatus that does not necessarily move during a communication operation. For example, at least one of the base station and the mobile station may be an Internet of Things (IoT) device such as a sensor.

Further, the base station in the present disclosure may be interchangeable with the user terminal. For example, each aspect/embodiment of the present disclosure may be applied to a configuration in which communication between the base station and the user terminal is replaced with communication among a plurality of user terminals (which may be referred to as, for example, device-to-device (D2D), vehicle-to-everything (V2X), and the like). In this case, the user terminal 20 may have the function of the above-described base station 10. Further, terms such as "uplink" and "downlink" may be replaced with terms corresponding to communication between terminals (for example, "side"). For example, the uplink channel, the downlink channel, and the like may be interchangeable with a side channel.

Similarly, the user terminal in the present disclosure may be interchangeable with the base station. In this case, the base station 10 may have the above-described functions of the user terminal 20.

In the present disclosure, the operation performed by the base station may be performed by an upper node thereof in some cases. In a network including one or more network nodes with base stations, it is clear that various operations performed for communication with a terminal can be performed by a base station, one or more network nodes (examples of which include but are not limited to a mobility management entity (MME) and a serving-gateway (S-GW)) other than the base station, or a combination thereof.

Each aspect/embodiment described in the present disclosure may be used alone, used in combination, or switched in association with execution. Further, the order of processing procedures, sequences, flowcharts, and the like of the aspects/embodiments described in the present disclosure may be re-ordered as long as there is no inconsistency. For example, regarding the methods described in the present disclosure, elements of various steps are presented using an illustrative order, and are not limited to the presented specific order.

Each aspect/embodiment described in the present disclosure may be applied to a system using long term evolution (LTE), LTE-advanced (LTE-A), LTE-beyond (LTE-B), SUPER 3G, IMT-Advanced, 4th generation mobile communication system (4G), 5th generation mobile communication system (5G), future radio access (FRA), new radio access technology (RAT), new radio (NR), new radio access (NX), future generation radio access (FX), global system for mobile communications (GSM (registered trademark)), CDMA2000, ultra mobile broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), or another appropriate radio communication method, a next generation system expanded based on these, and the like. Further, a plurality of systems may be combined and applied (for example, a combination of LTE or LTE-A and 5G, and the like).

The phrase "based on" used in the present disclosure does not mean "based only on", unless otherwise specified. In other words, the phrase "based on" means both "based only on" and "based at least on".

Any reference to elements with designations such as "first", "second", and the like used in the present disclosure does not generally limit the amount or order of these elements. These designations can be used in the present disclosure, as a convenient way of distinguishing between two or more elements. Therefore, reference to the first and second elements does not mean that only two elements are adoptable, or that the first element must precede the second element in some way.

The term "determining" used in the present disclosure may encompass a wide variety of operations. For example, "determining" may be regarded as judging, calculating, computing, processing, deriving, investigating, looking up, search, inquiry (for example, looking up in a table, database, or another data structure), ascertaining, and the like.

Furthermore, "determining" may be regarded as "determining" of receiving (for example, receiving of information), transmitting (for example, transmitting of information), input, output, accessing (for example, accessing to data in a memory), and the like.

Further, "determining" may be regarded as "determining" of resolving, selecting, choosing, establishing, comparing, and the like. In other words, "determining" may be regarded as "determining" of an operation.

Further, "determining" may be interchangeable with "assuming", "expecting", "considering", and the like.

The term "maximum transmission power" described in the present disclosure may mean the maximum value of transmission power, the nominal UE maximum transmit power, or the rated UE maximum transmit power.

As used in the present disclosure, the terms "connected" and "coupled", or any variation of these terms mean all direct or indirect connections or coupling between two or more elements, and may include the presence of one or more intermediate elements between two elements that are "connected" or "coupled" to each other. The coupling or connection between the elements may be physical, logical, or a combination of these. For example, "connection" may be interchangeable with "access".

In the present disclosure, when two elements are connected, these elements may be considered to be "connected" or "coupled" to each other by using one or more electrical wires, cables, printed electrical connections, and the like, and by using, as some non-limiting and non-inclusive examples, electromagnetic energy having a wavelength in the radio frequency domain, microwave domain, and optical (both visible and invisible) domain, and the like.

In the present disclosure, the phrase "A and B are different" may mean "A and B are different from each other". Note that the phrase may mean that "A and B are different from C". The terms such as "leave", "coupled", and the like may be interpreted as "different".

When the terms "include", "including", and variations thereof are used in the present disclosure, these terms are intended to be inclusive similarly to the term "comprising". Furthermore, the term "or" used in the present disclosure is intended not to be exclusive-OR.

In the present disclosure, when English articles such as "a", "an", and "the" are added in translation, the present disclosure may include the plural forms of nouns that follow these articles.

Although the invention according to the present disclosure has been described in detail above, it is obvious to a person skilled in the art that the invention according to the present disclosure is by no means limited to the embodiments described in the present disclosure. The invention according to the present disclosure can be embodied with various corrections and in various modified aspects, without departing from the spirit and scope of the invention defined based on the description of claims.

Thus, the description of the present disclosure is for the purpose of explaining examples and does not bring any limiting meaning to the invention according to the present disclosure.

The invention claimed is:

1. A terminal comprising:
    a transmitter that transmits a physical uplink shared channel (PUSCH) with configured grant;
    a receiver that receives downlink control information (DCI) indicating retransmission of the PUSCH with configured grant; and
    a processor that controls the retransmission of the PUSCH with configured grant, based on priorities that are independently configured for the transmission of the PUSCH with configured grant and the retransmission of the PUSCH with configured grant,
    wherein the priority configured for the transmission of PUSCH with configured grant is configured by radio resource control (RRC) signaling,
    wherein the processor determines, based on bit information included in the DCI, the priority configured for the retransmission of the PUSCH with configured grant, the DCI being DCI format 0_2, and
    wherein, when the bit information is not included in the DCI format 0_2, lower priority is configured for the retransmission of the PUSCH with configured grant.

2. A radio communication method for a terminal, comprising:
    transmitting a physical uplink shared channel (PUSCH) with configured grant;
    receiving downlink control information (DCI) indicating retransmission of the PUSCH with configured grant; and
    controlling the retransmission of the PUSCH with configured grant, based on priorities that are independently configured for the transmission of the PUSCH with configured grant and the retransmission of the PUSCH with configured grant,
    wherein the priority configured for the transmission of PUSCH with configured grant is configured by radio resource control (RRC) signaling,
    determining, based on bit information included in the DCI, the priority configured for the retransmission of the PUSCH with configured grant, the DCI being DCI format 0_2, and
    wherein, when the bit information is not included in the DCI format 0_2, lower priority is configured for the retransmission of the PUSCH with configured grant.

3. A base station comprising:
    a processor that configures transmission of a physical uplink shared channel (PUSCH) with configured grant; and
    a transmitter that transmits downlink control information (DCI) indicating retransmission of the PUSCH with configured grant,
    wherein the processor configures priorities independently for the transmission of the PUSCH with configured grant and the retransmission of the PUSCH with configured grant, and controls the retransmission of the PUSCH with configured grant,
    wherein the priority configured for the transmission of PUSCH with configured grant is configured by radio resource control (RRC) signaling,
    wherein the processor configures, by using bit information included in the DCI, the priority for the retransmission of the PUSCH with configured grant, the DCI being DCI format 0_2, and
    wherein, when the bit information is not included in the DCI format 0_2, lower priority is configured for the retransmission of the PUSCH with configured grant.

4. A system comprising a terminal and a base station, wherein
    the terminal comprises:
        a transmitter that transmits a physical uplink shared channel (PUSCH) with configured grant;
        a receiver that receives downlink control information (DCI) indicating retransmission of the PUSCH with configured grant; and
        a processor that controls the retransmission of the PUSCH with configured grant, based on priorities that are independently configured for the transmission of the PUSCH with configured grant and the retransmission of the PUSCH with configured grant,
        wherein the priority configured for the transmission of PUSCH with configured grant is configured by radio resource control (RRC) signaling, and
        wherein the processor determines, based on bit information included in the DCI, the priority configured for the retransmission of the PUSCH with configured grant, the DCI being DCI format 0_2, and
    the base station comprises:
        a processor that configures the transmission of the PUSCH with configured grant; and
        a transmitter that transmits the DCI,
        wherein the processor configures the priorities independently for the transmission of the PUSCH with configured grant and the retransmission of the PUSCH with configured grant, and controls the retransmission of the PUSCH with configured grant, wherein the processor configures, by using the bit information, the priority for the retransmission of the PUSCH with configured grant, and wherein, when the bit information is not included in the DCI format 0_2, lower priority is configured for the retransmission of the PUSCH with configured grant.

* * * * *